US010667222B2

(12) United States Patent
Nigam et al.

(10) Patent No.: US 10,667,222 B2
(45) Date of Patent: May 26, 2020

(54) TECHNIQUES TO CONTROL UE POWER-USAGE ON SHARED DOWNLINK SHARED CHANNEL REGION OF A SUBFRAME

(71) Applicant: QUALCOMM Incorporated, San Diego, CA (US)

(72) Inventors: Gaurav Nigam, San Diego, CA (US); Sibasish Das, San Diego, CA (US); Supratik Bhattacharjee, San Diego, CA (US); Ankit Verma, San Diego, CA (US); Hongbo Yan, Vista, CA (US); Navid Ehsan, San Diego, CA (US); Ashok Mantravadi, San Diego, CA (US); Surendra Boppana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 15/926,934

(22) Filed: Mar. 20, 2018

(65) Prior Publication Data
US 2018/0302864 A1 Oct. 18, 2018

Related U.S. Application Data

(60) Provisional application No. 62/485,248, filed on Apr. 13, 2017.

(51) Int. Cl.
*H04W 52/32* (2009.01)
*H04W 52/14* (2009.01)
*H04W 52/50* (2009.01)
*H04W 72/04* (2009.01)

(52) U.S. Cl.
CPC ....... *H04W 52/325* (2013.01); *H04W 52/143* (2013.01); *H04W 52/50* (2013.01); *H04W 72/042* (2013.01); *H04W 72/0446* (2013.01)

(58) Field of Classification Search
CPC . H04W 52/325; H04W 52/143; H04W 52/50; H04W 72/042; H04W 72/0446
See application file for complete search history.

(56) References Cited

U.S. PATENT DOCUMENTS

| 2010/0002638 A1 | 1/2010 | Park et al. |
| 2011/0170496 A1 | 7/2011 | Fong et al. |
| 2015/0117342 A1 | 4/2015 | Loehr et al. |

(Continued)

FOREIGN PATENT DOCUMENTS

WO   WO-2009/022294 A2   2/2009

*Primary Examiner* — Melvin C Marcelo
(74) *Attorney, Agent, or Firm* — Arent Fox, LLP

(57) ABSTRACT

Aspects of the present disclosure provide techniques for the user equipment (UE) to select a power management mode from a plurality of power management modes supported by the UE based on decoding of a portion of the downlink subframe. For example, when the UE receives a subframe from a base station, the UE may decode a control channel region of the subframe to determine whether the subframe includes a channel grant allocated to the UE. If no channel grant is included in the subframe, the UE may select a power management mode for the UE from the plurality of power management modes supported by the UE that maximizes the UE's sleep opportunities while balancing the deficient performance costs.

29 Claims, 7 Drawing Sheets

(56) References Cited

U.S. PATENT DOCUMENTS

| | | |
|---|---|---|
| 2016/0165541 A1 | 6/2016 | Camp, Jr. et al. |
| 2017/0339677 A1* | 11/2017 | Rico Alvarino ...... H04L 5/0091 |
| 2018/0063785 A1* | 3/2018 | Boixadera-Espax ........................ H04W 52/0287 |
| 2018/0098290 A1* | 4/2018 | Yu ........................ H04W 52/241 |
| 2019/0036673 A1* | 1/2019 | Chen ..................... H04L 1/1657 |
| 2019/0110332 A1* | 4/2019 | Wikstrom ............. H04W 76/28 |

* cited by examiner

TECHNIQUES TO CONTROL UE POWER-USAGE ON SHARED DOWNLINK SHARED CHANNEL REGION OF A SUBFRAME

CROSS-REFERENCE TO RELATED APPLICATION(S)

This application claims benefit of U.S. Provisional Application Ser. No. 62/485,248, entitled "TECHNIQUES TO CONTROL UE POWER-USAGE ON SHARED DOWNLINK SHARED CHANNEL REGION OF A SUBFRAME" and filed Apr. 13, 2017, which is expressly incorporated by reference herein in its entirety.

BACKGROUND

Aspects of the present disclosure relate generally to wireless communication networks, and more particularly to power management of a user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. However, as the demand for mobile broadband access continues to increase, there exists a need for further improvements in 5G communications technology and beyond.

One area of improvements has focused on managing power for mobile devices (e.g., UEs) that typically include a limited power source (e.g., battery). The processing requirements for UE during wireless communications may dictate the usable battery life of the UE. For example, if the UE is in connected mode (e.g., actively communicating with the network) and constantly processing downlink and uplink transmissions, the increased power consumption may adversely impact the battery life of the UE.

SUMMARY

Aspects of the present disclosure address the above-identified problem by implementing techniques for the UE that manages a plurality of power management modes and selects a power management mode for the UE based on decoding a portion of the downlink subframe. For example, when the UE receives a subframe from a base station, the UE may decode a control channel region of the subframe or through radio resource control (RRC) layer signaling to determine whether the subframe includes a channel grant allocated to the UE. If no channel grant is included in the subframe, the UE may select a power management mode for the UE from a plurality of power management modes supported by the UE that maximizes the sleep opportunities for the UE while balancing the deficient performance costs.

In one example, a method for wireless communications implemented by a UE is disclosed. The method may include receiving, at the UE, a subframe from a base station. In some examples, the UE may support a plurality of power management modes. The method may further include determining whether the subframe includes a channel grant allocated to the UE based on one or more of decoding the control channel region of the subframe or through RRC layer signaling. The method may further include selecting a power management mode for the UE from the plurality of power management modes based on the determining, and configuring the UE to the power management mode selected.

In another example, a UE for wireless communications is disclosed. The UE may include a memory configured to store instructions and a processor communicatively coupled with the memory. The processor may be configured to execute the instructions to receive, at the UE, a subframe from a base station. In some examples, the UE may support a plurality of power management modes. The UE may further include instructions executable by the processor to determine whether the subframe includes a channel grant allocated to the UE based on one or more of decoding the control channel region of the subframe or through RRC layer signaling. The processor may further execute instructions to select a power management mode for the UE from the plurality of power management modes based on the determining, and configure the UE to the power management mode selected.

In yet another example, a computer readable medium for wireless communications implemented by a UE is disclosed. The computer readable medium may include code for receiving, at the UE, a subframe from a base station. In some examples, the UE may support a plurality of power management modes. The computer readable medium may further include code for determining whether the subframe includes a channel grant allocated to the UE based on one or more of decoding the control channel region of the subframe or through RRC layer signaling. The computer readable medium may further include code for selecting a power management mode for the UE from the plurality of power management modes based on the determining, and configuring the UE to the power management mode selected.

In another example, an apparatus for wireless communications implemented by a UE is disclosed. The apparatus may include means for receiving, at the UE, a subframe from a base station. In some examples, the UE may support a plurality of power management modes. The apparatus may further include means for determining whether the subframe includes a channel grant allocated to the UE based on one or more of decoding the control channel region of the subframe or through RRC layer signaling. The apparatus may further include means for selecting a power management mode for the UE from the plurality of power management modes based on the determining, and configuring the UE to the power management mode selected.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
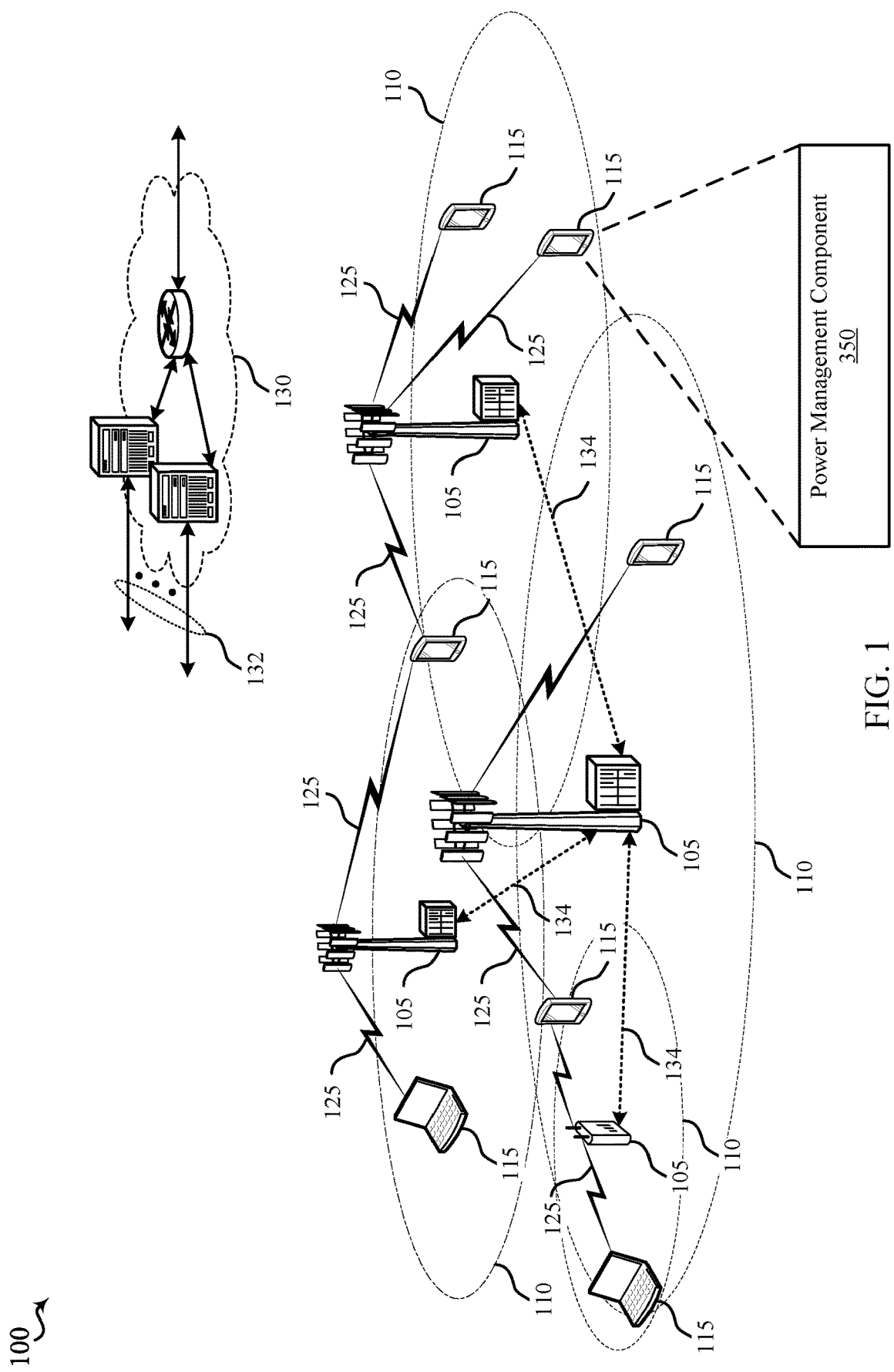
FIG. 1 illustrates an example of a wireless communications system in accordance with aspects of the present disclosure.

Power consumption in mobile devices (e.g., UEs) is an increasingly scrutinized metric. As the demand for mobile device connectivity has increased, the mobile devices are processing greater amounts of information. The processing for wireless communications uses extensive power resources. However, mobile devices are generally battery operated, and thus have a limited power supply. Aspects of the present disclosure provide techniques to control power-usage on a shared channel of a subframe to maximize the power savings at the UE, and thereby extend the battery life.

Specifically, in wireless communication systems such as LTE, a UE may receive a subframe from the network and decode the Physical Downlink Control Channel (PDCCH) region and the physical downlink shared channel (PDSCH) region of the subframe. For instance, in downlink, the PDCCH may appear in the first 1, 2 or 3 OFDM symbols at the beginning of every subframe. The actual number of symbols used by the PDCCH in a given subframe is communicated over the Physical Control Format Indicator Channel (PCFICH) and can change in response to demand. At the start of each 1 ms downlink subframe, the Physical Control Format Indicator Channel (PCFICH) is used to signal the number of OFDM symbols used for the PDCCH. The PDCCH regions of a subframe can be inferred from the control format indicator signaled through PCFICH transmissions. The PDCCH may be responsible for issuing scheduling or channel grants. The scheduling grants or channel grants may allocate resources on the downlink (PDSCH) or uplink (PUSCH). Thus, in connected mode, a UE may monitor the PDCCH that allow the UE to determine whether there is data waiting for the UE on the PDSCH, or if the UE has been allocated specific resources on the PUSCH. In the connected mode, an LTE UE decodes the PDCCH to check for the presence of PDSCH grants for the current subframe (SF).

However, in some instances, the UE may not receive a scheduling or channel grant. Nonetheless, in conventional systems, the UE processes both the PDCCH and PDSCH regions of the subframe. Such processing may be unnecessary if there are no PDSCH grants and the UE may conserve power consumption by opting to omit processing (or run with reduced processing) the PDSCH region of the subframe when there are no PDSCH grants detected for the UE based on decoding of the PDCCH region. In such situations, features of the present disclosure include techniques that take advantage of configuring the UE into a power management mode that provides improved power savings (in comparison to conventional systems), while minimizing performance degradation observed at the UE (e.g., in terms of failing to receive and process issued channel grants).

It should be appreciated that although the above example is described with reference to PDCCH and PDSCH regions, the techniques of the present disclosure may readily be extended to other wireless communications, including connected discontinuous reception (DRX) and/or evolved multimedia broadcast multicast services (eMBMS) deployments. Features of the present disclosure may also include manipulating the digital clock speed of the UE in processing the PDCCH region such that the UE may complete such processing earlier and conserve power.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some examples, one or more UEs 115 may include a power management component 350 to perform one or more techniques and methods described herein.

In some aspects, the UE 115 may support a plurality of power management modes. Each of the power management modes may enable a different configuration of system components for processing of a shared channel region of a subframe. For example, in accordance with aspects of the present disclosure, the power management component 350 may select a power management mode based on ambient channel conditions and measured channel grant statistics that maximize the battery life of the UE 115, while minimizing the performance degradation of the UE 115. Particularly, if the UE 115 has a low probability of receiving a channel grant, the power management component 350 may configure the UE 115 to a power management mode that attempts to save power during the processing of PDSCH region.

Features of the present disclosure provide a power management component 350 for the UE 115 to manage a plurality of power modes supported by the UE 115. Although, the present disclosure identifies three power modes below (full performance, power-performance tradeoff, and power optimal modes), it should be appreciated by those of ordinary skill in the art that this disclosure is not limited to the identified power modes. Indeed, the power management component 350 may manage and switch between any number of power modes to conserve power. Thus, for purposes of this disclosure, plurality of power management modes should be construed to be any number greater than or equal to at least two power modes (e.g., Full performance, power-optimal modes, etc.).

To this end, the power management component 350 may choose one of a plurality of power modes, including: i) full performance, ii) power-performance tradeoff, and iii) power optimal. In one example, the UE 115 may support a first power management mode (e.g., "full performance power management mode") that exhibits no performance deterioration on a scheduled subframe and also fails to offer any power savings. In such situations, the first power management mode may configure the UE to process both the PDCCH region and the PDSCH region of the subframe. This may be considered a baseline mode used for SCH reception and may entail minimal power savings. In other examples, the UE 115 may support a second power management mode (e.g., "power-performance management mode") so that the UE may optimize power savings with negligible performance degradation. In this second power management mode, the UE attains the enhanced power savings while ensuring negligible PDSCH performance loss. In some examples, performance loss may be based on a determination of data throughput decline observed by implementing the second power management mode. For example, a negligible performance loss may refer to less than one percentage throughput delta. The UE 115 may also support a third power management mode (e.g., "power optimal management mode") that maximizes power savings with measurable performance degradation. Under the third power management mode, the UE 115 may maximize power savings while maintaining receiver conformant to performance recommendations. As such, the performance realizations may range from greatest performance achieved by the first power management mode to the least performance achieved by the third power management mode.

In some examples, the power management component 350 may decode a control channel region of the subframe received from the base station to determine whether the current subframe includes a scheduling or channel grant allocated to the UE. Additionally or alternatively, the channel grant may be determined based on RRC layer signaling between the base station and the UE. If the decoding of the control channel region returns that a channel grant is included in the shared channel region, the power management mode may select a first power management mode from the plurality of power management modes supported by the UE 115. In one example, the first power management mode may be a default power management mode that configures the UE 115 to process both the control channel region and a shared channel region of the subframe.

In contrast, when the power management component 350 determines that the subframe fails to include a channel grant allocated to the UE 115, the power management component 350 may first evaluate the channel conditions between the UE 115 and the base station 115 and select a power management mode based on the channel conditions. For example, when the channel conditions between the UE 115 and the base station 105 exhibit deteriorating channel conditions (e.g., high Doppler or low signal to noise (SNR) ratio), the power management mode may prioritize performance over power savings and thus select the first power management mode. However, if the channel conditions between the UE 115 and the base station 105 are ideal (e.g., high SNR and low Doppler), the power management component 350 may select a different power management mode that omits decoding of the shared channel region of the subframe, and thus reduces power consumption.

Additionally or alternatively, the power management component 350 may monitor the channel grant inactivity in identifying a power management mode for the UE 115. Accordingly, the power management component 350 may track a channel grant elapsed time period (e.g., time period since the UE 115 last received a channel grant) and determine whether the channel grant elapsed time period satisfies (e.g., exceeds or is less than) a predetermined threshold. If the power management component 350 determines that the UE 115 has not received a channel grant for extended period of time (e.g., channel grant elapsed time period exceeds the predetermined threshold), the power management component 350 may select a second power management mode from a plurality of power management modes. In such situations, the second power management mode may optimize the UE 115 to conserve power by entering power-optimal mode. However, if the UE 115 has recently received a channel grant (e.g., channel grant elapsed time period is less than the predetermined threshold), the power management component 350 may select a second power management mode (e.g. power-performance trade-off mode) that prioritizes performance over power savings.

In some aspects, the UE 115 may further determine the UE resource capabilities in order to select a power management mode. Thus, the power management component 350 may select one of a plurality of available power management modes based on the evaluation of a power management mode that individually identifies candidate power management modes from a plurality of power management modes based on the channel condition parameters, the channel grant inactivity parameters, and/or the UE resources or capabilities. For example, the power management component 350, acting a master controller, may select either the first power management mode or the second power management mode or the third power management mode. If the evaluation of channel condition is poor, the power management component 350 in that case may return a selection of first power management mode (full performance), while the evaluation of channel grant inactivity returns a selection of a second power management mode, the power management component 350 may select the power management mode from the first power management mode that prioritizes performance over the power savings. However, if both evaluations select a second power management mode, the power management component 350 may select the second power management mode that prioritizes the power savings over performance. In some examples, the power management mode may be subdivided into multiple power management modes that include a varying degree of power savings and performance. In some aspects, each power management mode may correspond to different configurations that the UE 115 may execute. Each PM comes with a set of actions for the PDSCH part of the SF. These PM actions may turn on/off various system components when processing the PDSCH region. As a non-limiting example, one or more power management modes may provide the following configurations:

TABLE 1

| UE System Components | First Power Management Mode | Second Power Management Mode | Third Power Management Mode |
|---|---|---|---|
| PLLs | ON | ON | OFF |
| Analog Signal Path | ON | OFF | OFF |
| Mixed Signal Path | ON | ON | OFF |
| Digital Signal Path | ON | OFF | OFF |

As illustrated above, the first power management mode (PM1) may maintain all functionalities active, including the i) PLLs, ii) analog signal path processing, iii) mixed signal path process, and iv) digital signal path processing. In contrast, the second power management mode (PM2) may maintain two of the four system components, such as i) PLL and iii) mixed signal path, while the ii) analog signal path and iv) digital signal path processing may be disabled. Finally, the third power management mode (PM3) may disable all the UE system components. As such, the third power management mode (PM3) may provide the most power savings because it turns off all the paths and least performance capabilities, while the first power management mode may provide the most performance capabilities, and virtually no power savings for the UE. The second power management mode may offer a balanced approach in that while some functionalities are active, others are disabled, thereby offering opportunities to the UE to conserve power. Enforcing a power management mode (e.g., PM1, PM2, or PM3) may entail triggering one or more features that may be associated with that power management mode reflected in Table 1. It should be appreciated that the present disclosure is not limited to the evaluation factors discussed above, but may also include other evaluation factors that contribute to the overall PM evaluation. One such example may be the extension section for connected mode discontinuous reception (CDRx) of the UE 115 where even while there is no traffic between the network and UE 115, the UE 115 keeps listening to the network.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, gNodeB, gNB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) or gNB may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. In accordance with features of the present disclosure, the licensed assisted access (LAA) for LTE communications or LTE-Advanced (LTE-A) communications may provide supplemental services with secondary component carrier placed in an unlicensed spectrum. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1), TDD (e.g., frame structure type 2), and LTE-U/LAA (e.g., frame structure type 3). Moreover, in some aspects, the communication links 125 may represent one or more broadcast channels.

In some examples, features of the present disclosure may determine whether the UE is configured with one or more of frame structure type 3 (e.g., LTE-U/LAA) or evolved multimedia broadcast multicast services (eMBMS) service for secondary component carrier. Further, if the primary component carrier cell radio network temporary identifier (C-RNTI) is disabled, aspects of the present disclosure may force a power optimal power management mode (e.g., PM3) from the plurality of power management modes.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2A:
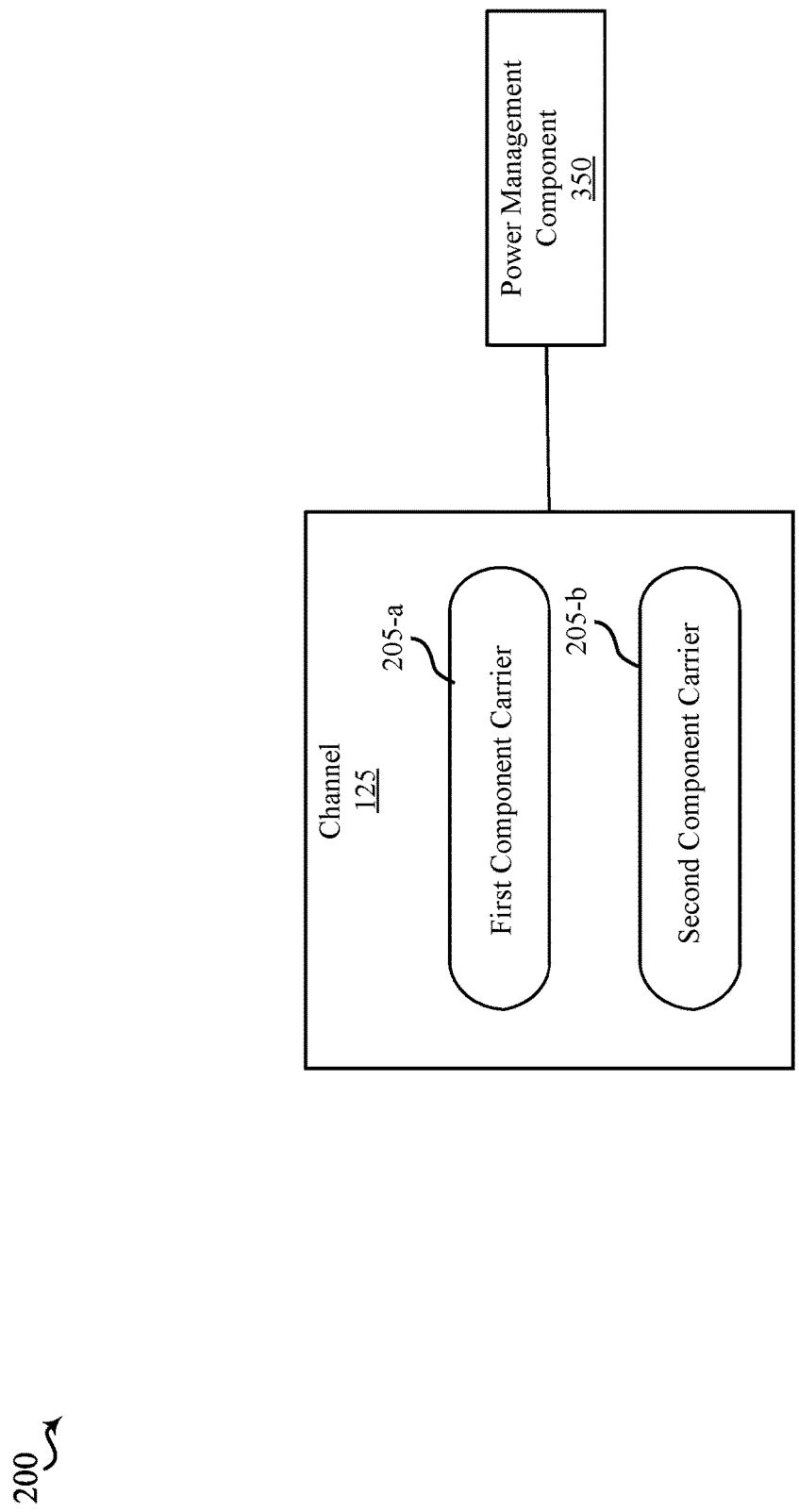
FIGS. 2A-2D are an example of power management system employed in accordance with aspects of the present disclosure.

FIGS. 2A-2D describe an example of power management systems employed in accordance with aspects of the present disclosure. Turning first to FIG. 2A, a power management system 200 illustrates one example of the power management component 350 controller implementing the techniques of selecting a power management modes of the UE 115 based on the channel conditions and measured grant statistics in accordance with features of the present disclosure.

In some examples, the wireless communication link 125 described with reference to FIG. 1 above may include a channel for transmitting information between the UE 115 and the base station 105. The channel may be further subdivided into a plurality of component carriers 205 (e.g., first component carrier 205-*a* and second component 205-*b*). Although FIG. 2A illustrates only two component carriers, it should be appreciated that the channel may be subdivided into any number of the component carriers. Specifically, in wireless communications, carrier aggregation or channel aggregation may enable multiple carriers to be used together in order to provide high data rates. Using carrier aggregation, it is possible to utilize more than one carrier in order to increase the overall transmission bandwidth. The channels 125 or carriers (205, 210) may be in contiguous elements of the spectrum, or they may be in different bands. In some examples, the aggregated channel 125 can be considered by the terminal (e.g., UE 115) as a single enlarged channel.

In the context of the power management system 200, the power management component 350 may act as a master controller for the entire channel 125 that may include one or more component carriers 205. In some examples, the power management component 350 may be part of the UE 115. The UE 115, upon receiving a subframe from a network, may decode a control channel region (e.g., PDCCH) of the subframe (e.g., first few OFDM symbols of the subframe) or read through RRC layer signaling to determine whether the subframe includes a channel grant allocated to the UE 115. Based on the determining, the power management component 350 may select a power management mode from a plurality of power management modes supported by the UE 115. In the event that no channel grant is included in the subframe, the power management component 350 may select a power management mode that omits decoding the shared channel region (e.g., PDSCH grant or physical multicast channel (PMCH) grant for eMBMS service). As such, the UE 115 under the configuration of the selected power management mode may enter a low power mode to conserve UE power consumption.

In one example, the power management component 350 has a plurality of modules that may evaluate and determine a suitable PM for the UE. First, the selection of the power management mode may be based on determination of the channel condition (e.g., based on channel quality indicator (CQI)) that identifies the SNR and Doppler parameters associated with the channel 125 between the UE 115 and the base station 105. This module will look at ambient channel conditions and determine the best PM for the UE and vote for one of the three PMs. In one example, the module may be referred to as ChannelConditionPMEval. The module may estimate the SNR and Doppler detected by the UE on this component carrier (CC) and prioritize performance by choosing PM1 over PM2 in challenging channel conditions such as low SNR or high Doppler so as to improve performance. Additionally or alternative, the power management component 350 may select PM3 if the channel grant are not received for a period of time. Additionally or alternatively, the second module of the power management component 350 may monitor the channel grant inactivity period (e.g., channel grant elapsed time period) that maintains a time period since a last channel grant was received by the UE 115, that is, the module keeps track of how often the UE 115 has been scheduled with SCH grants. As such, the power management component 350 may maintain the periodicity of the UE 115 receiving channel grants. If the UE 115 has a low probability of receiving a grant based on the frequency (or infrequency) of prior channel grants received, the power management component 350 may select a power management mode that maximizes power saving properties over UE performance. The present module monitors the time elapsed since the last SCH grant and allows PM3 if this monitored time is greater than a threshold. In one example, the module may be referred to as SCHInactivityPMEval. Another module may evaluate the power modes based on the UE resources and capabilities supported by the UE 115. For example, if one or more of the power modes is not supported by the UE 115, the "UEResourcePMEval" module may select an alternative power mode that is supported.

Another module, referred to as an "OverallPMEval" module, may generate the PM recommendation by choosing the lower of the multiple PM choices returned by the two modules above. For instance, if ChannelConditionPMEval returns PM1 and SCHInactivityPMEval returns PM2, then the controller will opt for PM1. After PDCCH results are available on the current subframe, the controller will enforce i) the PM returned by the OverallPMEval module if no grants are detected on the current SF, or ii) PM1 otherwise.

Conversely, if the power management component 350 determines that a channel grant is included in the subframe, the power management component 350 may select a power management mode from a plurality of power management modes supported by the UE 115 that prioritizes performance over power savings. As such, in the selected power management mode, the UE 115 may decode both the control channel region and a shared channel region of the subframe, and thus forego an opportunity to conserve power.

In other examples, the controller is readily extended to special transmission cases. In a first special transmission case, the present method and apparatus may be extended to the eMBMS service. If the UE 115 is configured with PMCH grants for eMBMS service then i) the ChannelConditionPMEval stays unchanged and ii) the SCHInactivityPMEval treats a PMCH grant as an SCH grant. In a second special transmission case, the UE 115 is configured with connected DRx (CDRx) transmissions, i) the ChannelConditionPMEval stays unchanged, and ii) there will be changes for SCHInactivityPMEval. These changes include a) Set a suitable threshold based on the length of the onDuration configured; b) Return PM2 if onDurationTimer has expired but drx-RetransmissionTimer has not expired; c) Return PM2 if drx-RetransmissionTimer has expired and remaining drx-Inactivity-Timer is less than a threshold; and d) Return PM3 if drx-RetransmissionTimer has expired and remaining drx-Inactivity-Timer is greater than a threshold or if PM3CDRxEval returns true. In a third special transmission case, the clock is altered for digital processing. For example, the power management component 350 may manipulate the digital clock speed of the UE 115 in order to enhance power savings for the UE 115. For example, the power management component 350 may select a power management mode that increases the processing of the control channel region (e.g., PDCCH) by increasing the clock rate of the UE 115. While the increase of the clock rate may increase power consumption initially during the processing of the control channel region, such techniques may preserve time for further processing (e.g., processing the shared channel region) and thereby allow the UE 115 to lengthen the sleep time. In such implementation, the power management component 350 may determine whether the power savings offered by the increasing of clock rate outweigh the power utilization expended on the increased clock rate in determining whether to increase the clock rate of the UE 115. This is detectable by measuring the clock rate when the UE 115 is in a given PM.

Figure 2B:
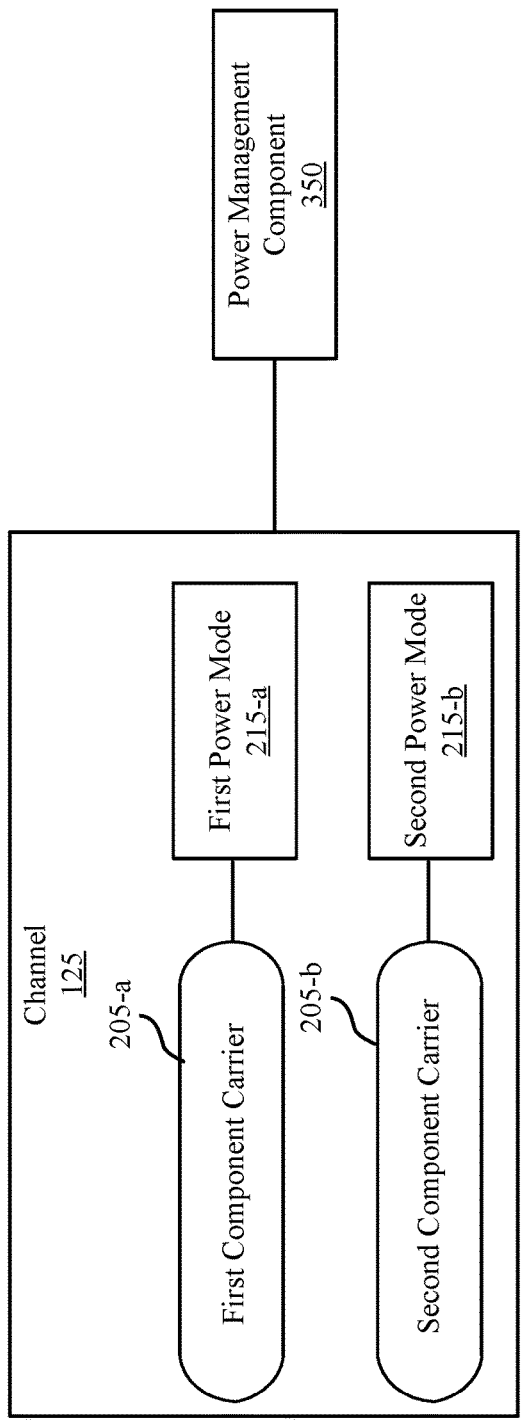

Turning next to FIG. 2B, a power management system 250 illustrates another example of the power management component 350 controller that enforces individual power mode configurations for each of the plurality of component carriers 205. In contrast to FIG. 2A where the power management component 350 selects one power management mode for the plurality of component carriers 205, the power management system 250 of FIG. 2B provides techniques where each component carrier 205 may be allocated a corresponding power mode. For example, a first power management mode 215-a may be selected for first component carrier 205-a, while a second power management mode 215-b may be selected for a second component carrier 205-b. The first power management mode 215-a and the second power management mode 215-b may be different power management modes. Each of the individual selections may be managed by a power management component 350.

Figure 2C:
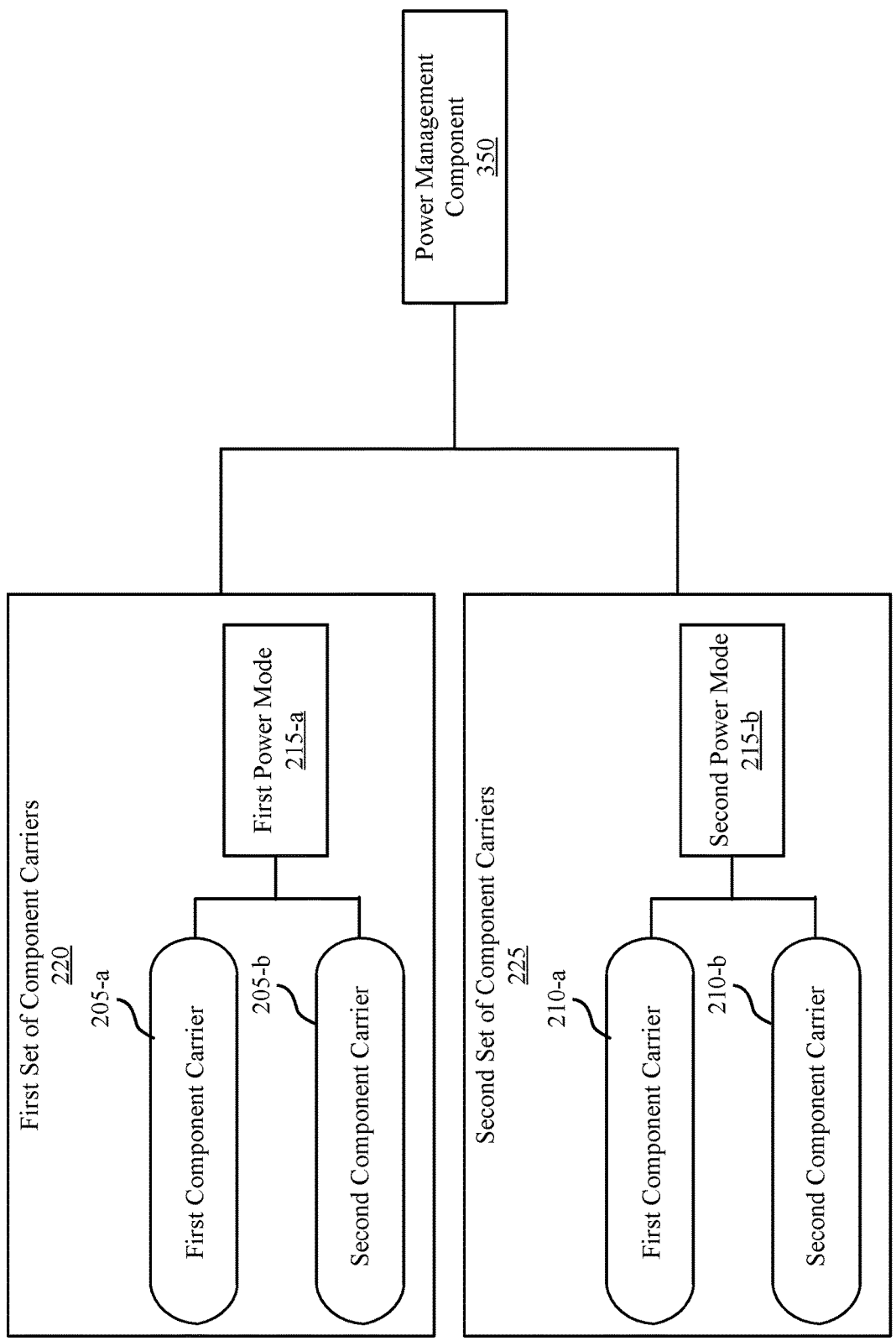

Additionally or alternatively, as illustrated in FIG. 2C, aspects of the present disclosure contemplate selecting individual power management modes for different sets of component carriers. All activated component carriers (CCs) are split into a plurality of groups. In the power management system 275, a first power management mode 215-a may be selected for a first set of component carriers 220 and a second power management mode 215-b may be selected for a second set of component carriers 225. The first set of component carriers 220 may include a first component carrier 205-a and second component carrier 205-b, and the second set of component carriers 225 may additionally include a first component carrier 210-a and second component carrier 210-b. Each of the power management modes may be managed by the power management component 350. CCs on a PM mode which can be enforced independently without impacting reception on other active CCs are called independent CCs. CCs on which PM cannot be enforced without impacting reception on other active CCs are called shared CCs. Independent CCs can be Interband carriers that have independent controllers and RX chains so that each carrier can enforce their recommended PM independently. The following is a method to handle N shared CCs. The N Shared CCs run their own independent controllers and come up with PM recommendations $\{P_0, P_1, \ldots, P_{N-1}\}$. A system-wide recommendation PM Psys=min($\{P0, P1, PN-1\}$) is selected, i.e., the lowest power mode is selected as the system power mode.

On each subframe, the PDCCH result (grant, no-grant) and PDCCH-done-time may be monitored for each CC. The CC that completes PDCCH last may be selected as the master CC because by that time each CC will have a PM mode and it will be known whether the carriers have a grant or not. The master CC may control enforcement across all CCs as follows: If all N sharing CCs receive no SCH grants, the master CC enforces Psys on each CC. If any of the sharing CCs sees a SCH grant for that CC, PM1 is enforced on all CCs. All of these shared carriers will implement the same power mode. When all CCs have finished PDCCH processing, the weakest power mode, i.e., the one with the lowest number is selected. As such, the master CC may monitors two aspects: i) gets a recommendation for power mode from all dependent CCs and ii) enforces the CC PM decision on the group of dependent CCs. Note that it is possible for the UE 115 to have multiple groups of shared CCs. In such a case, each group will independently follow the algorithm above.

Figure 2D:
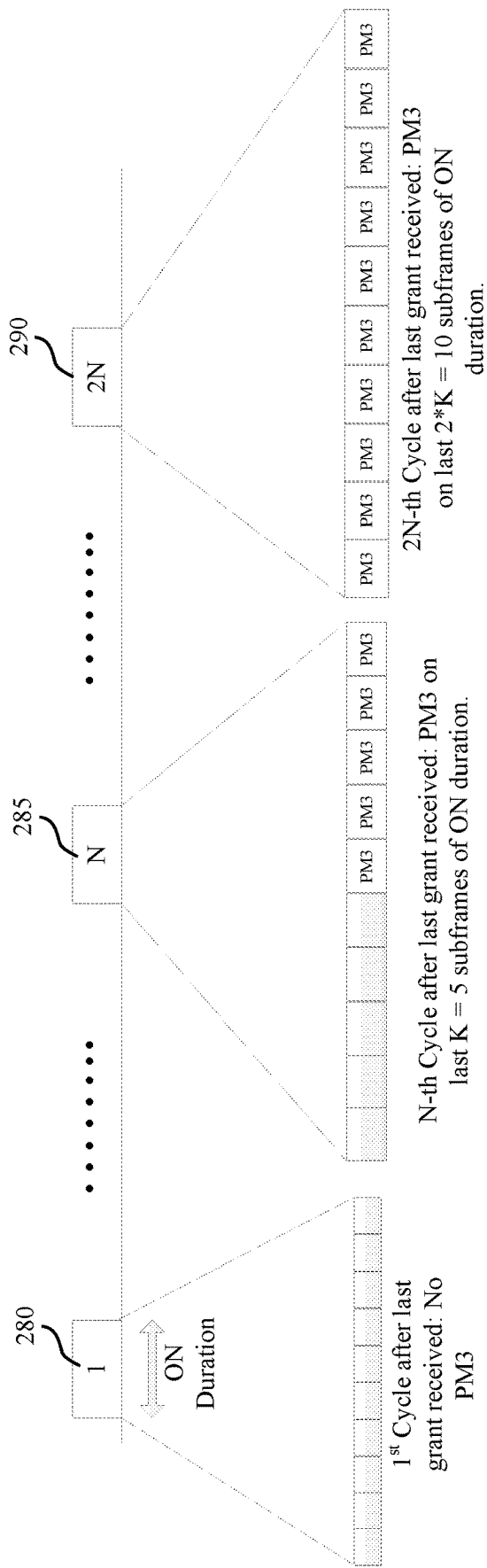

Turning next to FIG. 2D, an example of power mode configuration for UE 115 with respect to CDRx transmission evaluation is described. As discussed above, features of the present disclosure are not limited to the evaluation modules described above. Instead, the UE 115 may consider other factors such as CDRx as contributing towards the overall power mode evaluation. In some examples, where the channel condition remains largely unchanged, the UE 115 may monitor the CDRx evaluation to determining the onDuration and the last channel grant.

In one instance, the UE 115 may count the number of CDRx cycles that have elapsed since the last channel grant received by the UE 115. Based on the count of the number of CDRx cycles that have elapsed, the UE 115 may configure the UE 115 to a power mode (e.g., PM3) for K number of subframes. For instance, in the illustrated example, the value of K may be set to 5 subframes with 10 ms of "ON duration" period. Thus, during the first ON Duration cycle 280 after the last channel grant is received, no subframes during the first ON Duration cycle may be transitioned to PM3. However, if, during the N-th ON Duration cycle 285, if no channel grant is received, five of the ten subframes may be transitioned to PM3. Similarly, if during the 2N-th ON Duration cycle 290, no channel grants are received by the UE 115, the UE 115 may transition all ten subframes to PM3. As such, the transition from PM1 to PM3 is gradual based on monitoring of the CDRx cycles elapsed since the last channel grant is received by the UE 115.

Figure 3:
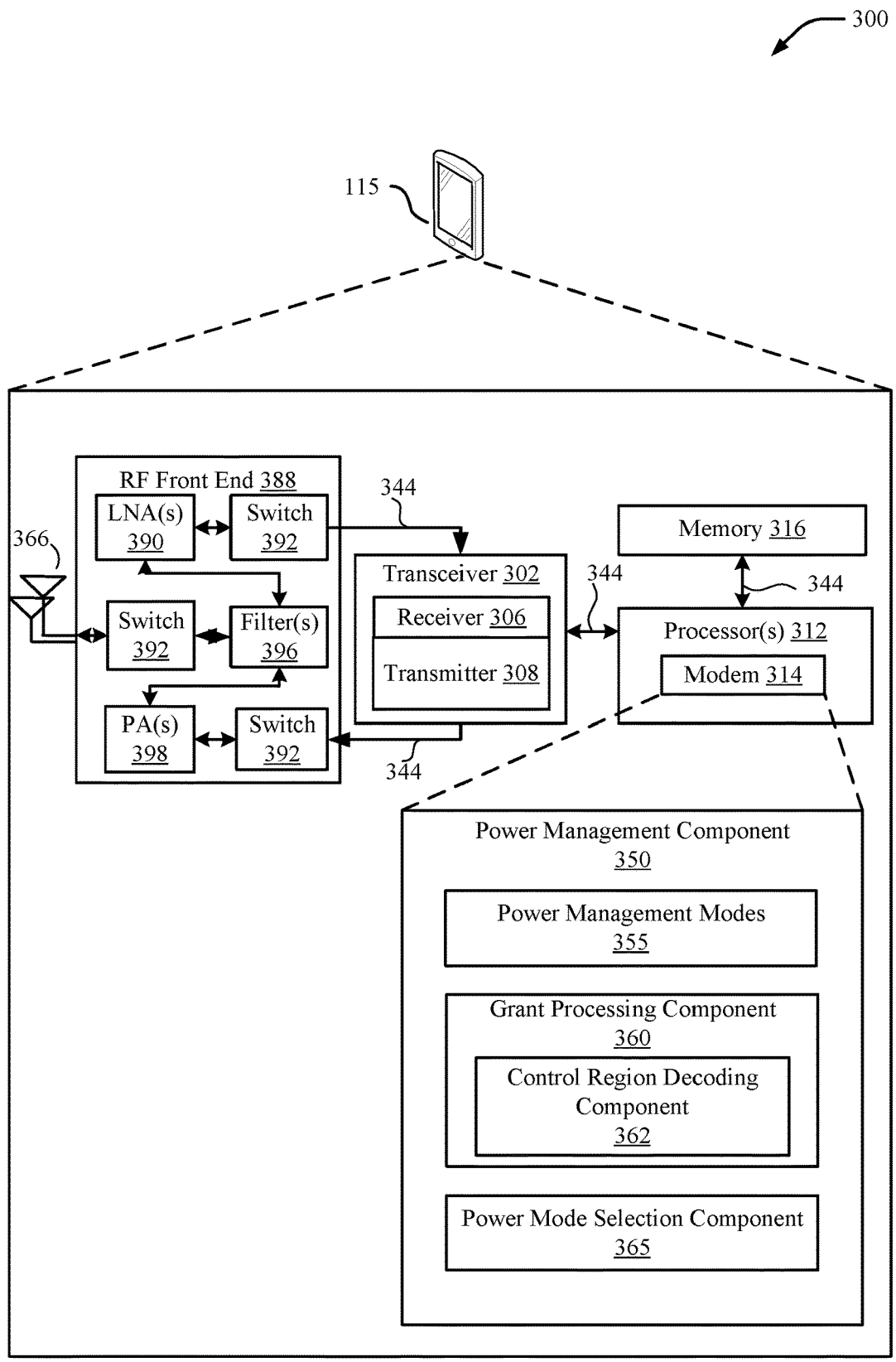
FIG. 3 is a schematic diagram of an aspect of an implementation of various components of a transmitting device (e.g., base station) in accordance with various aspects of the present disclosure.

FIG. 3 describes hardware components and subcomponents of a UE 115 for implementing one or more methods (e.g., method 400) described herein in accordance with various aspects of the present disclosure. For example, one example of an implementation of the UE 115 may include a variety of components, some of which have already been described above, but including components such as one or more processors 312 and memory 316 and transceiver 302 in communication via one or more buses 344, which may operate in conjunction with the power management component 350 for selecting a power management mode from a plurality of power management modes 355 supported by the UE 115.

In some examples, the power management component 350 may include a grant processing component 360 for decoding a portion of a downlink subframe received by the UE 115 from a base station 105. The grant processing component 360 may determine whether the subframe includes a channel grant allocated to the UE 115 based on the decoding of the control channel region. The power management component 355 may also include a power mode selection component 365 that selects a power management mode for the UE 115 based on determining whether the channel grant is included in the subframe. Accordingly, the power management component 350 may configure the UE 115 to the selected power management mode.

The one or more processors 312, modem 314, memory 316, transceiver 302, RF front end 388 and one or more antennas 366, may be configured to support voice and/or data calls (simultaneously or non-simultaneously) in one or more radio access technologies. In an aspect, the one or more processors 312 can include a modem 314 that uses one or more modem processors. The various functions related to power management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with power management component 350 may be performed by transceiver 302.

Also, memory 316 may be configured to store data used herein and/or local versions of applications or power management component 350 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining power management component 350 and/or one or more of its subcomponents, and/or data associated therewith, when UE 115 is operating at least one processor 312 to execute power management component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one UE 115. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the UE 115 may include RF front end 388, which may operate in communication with one or more antennas 366 and transceiver 302 for receiving and transmitting radio transmissions, for example, wireless communications transmitted by at least one base station 105 or wireless transmissions transmitted by UE 115. RF front end 388 may be connected to one or more antennas 366 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 290 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 366 via RF front end 388. In an aspect, transceiver may be tuned to operate at specified frequencies such that transmitting device can communicate with, for example, one or more base stations 105 or one or more cells associated with one or more base stations 105. In an aspect, for example, modem 314 can configure transceiver 302 to operate at a specified frequency and power level based on the configuration of the transmitting device and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of transmitting device (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information as provided by the network during cell selection and/or cell reselection.

Figure 4:
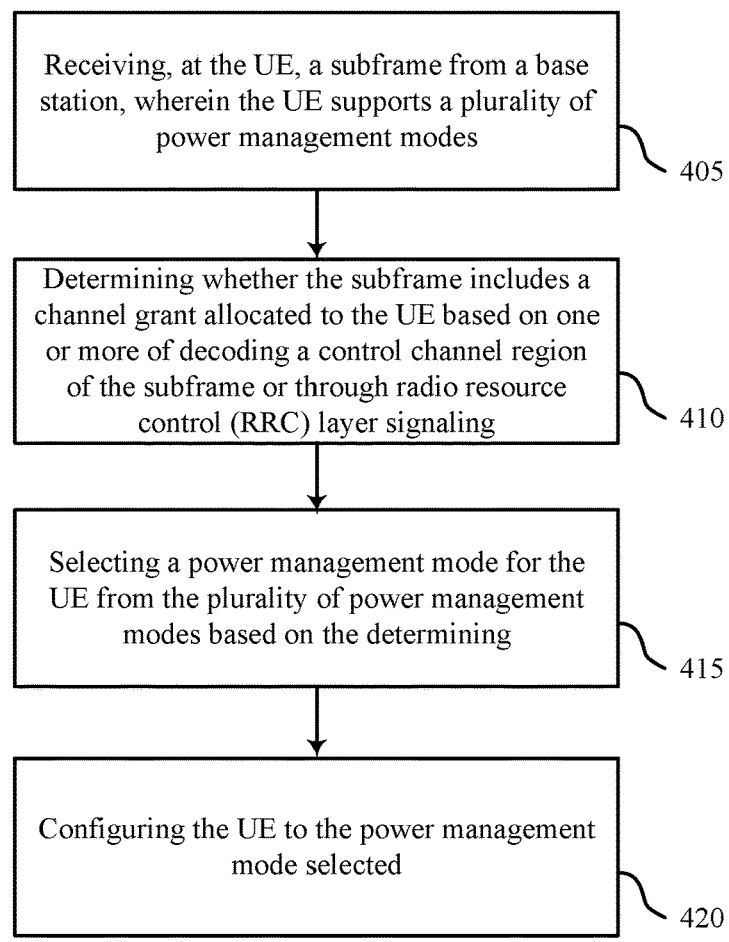
FIG. 4 is a flowchart of an example method for managing power of a UE in accordance with aspects of the present disclosure.

FIG. 4 is a flowchart of an example method 400 for managing power of a UE 115 in accordance with aspects of the present disclosure. The method 400 may be performed by a UE 115. Although the method 400 is described below with respect to the elements of the UE 115, other components may be used to implement one or more of the steps described herein.

At block 405, the method 400 may include receiving, at the UE, a subframe from a base station. The UE 115 may support a plurality of power management modes. Each of the power management modes may enable a different configuration of a system components for processing of shared channel region. Aspects of block 405 may be performed by the transceiver 302 described with reference to FIG. 3.

At block 410, the method 400 may include determining whether the subframe includes a channel grant allocated to the UE based on one or more of decoding a control channel region of the subframe or through radio resource control (RRC) layer signaling in case of eMBMS service. Aspects of block 410 may be performed by combination of the grant processing component 360 and control region decoding component 362 described with reference to FIG. 3.

At block 415, the method 400 may include selecting a power management mode for the UE from the plurality of power management modes based on the determining. In some examples, selecting the power management mode from the plurality of power management modes may include determining that the subframe includes a channel grant allocated to the UE 115. The UE 115 may select the power management mode from the plurality of power management modes supported by UE 115 in response to the subframe including the channel grant. In such situations, the power management mode may configure the UE 115 to decode both the control channel region and a shared channel region of the subframe.

In other examples, selecting the power management mode from the plurality of power management modes may include determining that the subframe fails to include the channel grant allocated to the UE. As such, the UE may select the power management mode from the plurality of power management modes supported by the UE in response to the subframe failing to include the channel grant. In such situation, the power management mode selected may configure the UE to omit decoding a shared channel region of the subframe. When the subframe fails to include a channel grant, the selection process may further include determining a channel condition between the UE and the base station and identifying a first candidate power management mode from the plurality of power management modes. Further, the UE may monitor a channel grant elapsed time period. The channel grant elapsed time period may maintain a time period since a last channel grant was received by the UE. As such, the UE maintains the periodicity of the channel grants. The UE may further determine whether the channel grant elapsed time period satisfies a threshold, and identifying a second candidate power management mode from the plurality of power management modes.

As such, the UE may select the power management from the first candidate power management mode or the second channel power management mode based on determining that the subframe includes the channel grant allocated to the UE. When the subframe includes the channel grant, the UE may select a default power management mode that configures the UE to decode both the control channel region and a shared channel region of the subframe. In contrast, when the subframe fails to include the channel grant allocated to the UE, the UE selects from a plurality of candidate power management modes. As a non-limiting example, the UE may select the first candidate power management mode or the second candidate power management where the selected power management mode configures the UE to omit decoding a shared channel region of the subframe.

In some aspects, the channel between the UE and the base station may be subdivided into a plurality of component carries. As such, selecting the power management mode from the plurality of power management modes may comprise selecting a first power management mode for a first component carrier from the plurality of component carriers, and selecting a second power management mode for a second component carrier from the plurality of component carriers. Accordingly, each component carrier may include an independent power management mode.

Alternatively, in an example of a shared component carrier configuration, the UE may select a power management mode that is shared by the plurality of component carriers. Additionally or alternatively, the UE may select a first power management mode shared by a first set of the plurality of component carriers and a second power management mode shared by a second set of the plurality of component carriers. In some aspects, the power management mode selected may configure the UE to increase a clock rate to process the control channel region of the subframe. By increasing the clock rate for digital processing, the UE may increase the power savings by extending the UE's sleep time. Aspects of block 415 may be performed by power mode selection component 365 described with reference to FIG. 3.

At block 420, the method 400 may further include configuring the UE to the power management mode selected. Aspects of block 420 may be performed by power management component 350 and power mode selection component 365 described with reference to FIG. 3.

FIG. 5 is a flowchart of an example method 500 for managing power of a UE 115 in accordance with aspects of the present disclosure. The method 500 may be performed by a UE 115. Although the method 500 is described below with respect to the elements of the UE 115, other components may be used to implement one or more of the steps described herein.

At block 505, the method 500 may include selecting at least one power management mode for the UE from a plurality of power management modes based on the determining which includes i) full performance mode, ii) power-performance tradeoff mode, and iii) power optimal mode.

At block 515, selecting the power management mode from the plurality of power management modes may comprise selecting a first power management mode for at least a first component carrier from a plurality of component carriers, and selecting a second power management mode for at least a second component carrier from the plurality of component carriers.

At block 520, the method 500 may further include configuring the UE to the power management mode selected. Aspects of block 520 may be performed by power management component 350 and power mode selection component 365 described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:
   receiving, at the UE, a subframe from a base station, wherein the UE supports a plurality of power management modes;
   determining whether the subframe includes a channel grant allocated to the UE based on one or more of decoding a control channel region of the subframe or through radio resource control (RRC) layer signaling;
   selecting a power management mode for the UE from the plurality of power management modes based on the determining; and
   configuring the UE to the power management mode selected,
   wherein selecting the power management mode from the plurality of power management modes based on the determining comprises:
   determining at least one channel condition between the UE and the base station; and
   identifying a first candidate power management mode from the plurality of power management modes based on determining the channel condition, wherein the plurality of power management mode comprises at least a full performance mode, a power-performance tradeoff mode and a power optimal mode.

2. The method of claim 1, wherein full performance mode exhibits no performance deterioration on scheduled subframe and no power savings, the power-performance tradeoff mode optimizes power savings with negligible performance hit, and the power optimal mode maximizes power savings with a noticeable performance hit.

3. The method of claim 1, wherein selecting the power management mode from the plurality of power management modes based on the determining comprises:
   determining that the subframe includes the channel grant allocated to the UE; and
   selecting the power management mode from the plurality of power management modes supported by the UE in response to the subframe including the channel grant, wherein the power management mode configures the UE to decode both the control channel region and a shared channel region of the subframe.

4. The method of claim 1, wherein each power mode has actions which may turn on or off system components when processing the control channel region, wherein said system components include phase lock loops (PLLs), analog signal path, digital signal path, and a mixed signal path.

5. The method of claim 1, wherein selecting the power management mode from the plurality of power management modes based on the determining comprises:
   determining that the subframe fails to include the channel grant allocated to the UE; and
   selecting the power management mode from the plurality of power management modes supported by the UE in response to the subframe failing to include the channel grant, wherein the power management mode configures the UE to omit decoding a shared channel region of the subframe.

6. The method of claim 1, further comprising:
   monitoring a channel grant elapsed time period, wherein the channel grant elapsed time period maintains a time period since a last channel grant received by the UE;
   determining whether the channel grant elapsed time period satisfies a threshold; and
   identifying a second candidate power management mode from the plurality of power management modes based on determining whether the channel grant elapsed time period satisfies the threshold.

7. The method of claim 1, wherein selecting the power management mode comprises:
   selecting the power management mode from a first candidate power management mode or a second candidate power management mode based on determining that the subframe includes the channel grant allocated to the UE, wherein the power management mode selected is a default power management mode that configures the UE to decode both the control channel region and a shared channel region of the subframe.

8. The method of claim 1, wherein selecting the power management mode from the plurality of power management modes comprises:
   selecting the power management mode from a first candidate power management mode or a second candidate power management mode based on determining that the subframe fails to include the channel grant allocated to the UE, wherein the power management mode selected configures the UE to omit decoding a shared channel region of the subframe.

9. The method of claim 8, further comprising:
   select a less performance-impacting power management mode of the two power management mode choices returned by the first candidate power management mode and the second candidate power management mode.

10. The method of claim 1, wherein selecting the power management mode from the plurality of power management modes based on the determining comprises:
 selecting a first power management mode for a first component carrier from the plurality of active component carriers; and
 selecting a second power management mode for a second component carrier from the plurality of active component carriers.

11. The method of claim 1,
 wherein selecting the power management (PM) mode from the plurality of power management modes based on the determining comprises selecting a first power management mode shared by a first set of the plurality of active component carriers and a second power management mode shared by a second set of the plurality of active component carriers.

12. The method of claim 1, wherein selecting the power management mode from the plurality of power management modes based on the determining comprises:
 monitoring connected mode discontinuous reception (CDRx) of the UE to identify number of CDRx cycles that have elapsed since last channel grant received by the UE; and
 selecting the power management mode for the UE from the plurality of power management modes based on the monitoring.

13. The method of claim 1, wherein selecting the power management mode from the plurality of power management modes based on the determining comprises:
 select the power management mode that increases processing of control channel region by increasing a clock rate of the UE.

14. The method of claim 1, wherein selecting the power management mode from the plurality of power management modes based on the determining comprises:
 determining whether the UE is configured with one or more of a frame structure type 3 or evolved multimedia broadcast multicast services (eMBMS) service for secondary component carrier;
 determining that primary component carrier cell radio network temporary identifier (C-RNTI) is disabled; and
 forcing a power optimal power management mode from the plurality of power management modes.

15. The method of claim 1, wherein the channel grant is in first one, two or three symbols of the subframe when the subframe includes the channel grant.

16. A user equipment (UE) for wireless communications, comprising:
 a memory configured to store instructions;
 a processor communicatively coupled with the memory, the processor configured to execute the instructions to:
  receive, at the UE, a subframe from a base station, wherein the UE supports a plurality of power management modes;
  determine whether the subframe includes a channel grant allocated to the UE based on one or more of decoding a control channel region of the subframe or through radio resource control (RRC) layer signaling;
  select a power management mode for the UE from the plurality of power management modes based on the determining; and
  configure the UE to the power management mode selected,
 wherein the instructions to select the power management mode from the plurality of power management modes based on the determining are further configured to:
  determine at least one channel condition between the UE and the base station; and
  identify a first candidate power management mode from the plurality of power management modes based on determining the channel condition, wherein the plurality of power management mode comprises at least a full performance mode, a power-performance tradeoff mode and a power optimal mode.

17. The UE of claim 16, wherein the instructions to select the power management mode from the plurality of power management modes based on the determining are further configured to:
 determine that the subframe includes the channel grant allocated to the UE; and
 select the power management mode from the plurality of power management modes supported by the UE in response to the subframe including the channel grant, wherein the power management mode configures the UE to decode both the control channel region and a shared channel region of the subframe.

18. The UE of claim 16, wherein each power mode has actions which may turn on or off system components when processing the control channel region, wherein said system components include phase lock loops (PLLs), analog signal path, digital signal path, and a mixed signal path.

19. The UE of claim 16, wherein the instructions to select the power management mode from the plurality of power management modes based on the determining are further configured to:
 determine that the subframe fails to include the channel grant allocated to the UE; and
 select the power management mode from the plurality of power management modes supported by the UE in response to the subframe failing to include the channel grant, wherein the power management mode configures the UE to omit decoding a shared channel region of the subframe.

20. The UE of claim 16, further includes instructions executable by processor to:
 monitor a channel grant elapsed time period, wherein the channel grant elapsed time period maintains a time period since a last channel grant received by the UE;
 determine whether the channel grant elapsed time period satisfies a threshold; and
 identify a second candidate power management mode from the plurality of power management modes based on determining whether the channel grant elapsed time period satisfies the threshold.

21. The UE of claim 16, wherein the instructions to select the power management mode are further configured to:
 select the power management mode from a first candidate power management mode or a second candidate power management mode based on determining that the subframe includes the channel grant allocated to the UE, wherein the power management mode selected is a default power management mode that configures the UE to decode both the control channel region and a shared channel region of the subframe.

22. The UE of claim 16, wherein the instructions to select the power management mode are further configured to:
 select the power management mode from a first candidate power management mode or a second candidate power management mode based on determining that the subframe fails to include the channel grant allocated to the UE, wherein the power management mode selected configures the UE to omit decoding a shared channel region of the subframe.

23. The UE of claim 22, wherein the instructions are further executable by the processor to:
select a less performance-impacting power management mode of the two power management mode choices returned by the first candidate power management mode and the second candidate power management mode.

24. The UE of claim 16, wherein the instructions to select the power management mode from the plurality of power management modes based on the are further configured to:
select a first power management mode for a first component carrier from the plurality of active component carriers; and
select a second power management mode for a second component carrier from the plurality of active component carriers.

25. The UE of claim 16, wherein the instructions to select the power management (PM) mode from the plurality of power management modes based on the determining are further configured to:
select a first power management mode shared by a first set of the plurality of active component carriers and a second power management mode shared by a second set of the plurality of active component carriers.

26. The UE of claim 16, wherein the instructions to select the power management mode from the plurality of power management modes are further configured to:
monitor connected mode discontinuous reception (CDRx) of the UE to identify number of CDRx cycles that have elapsed since last channel grant received by the UE; and
select the power management mode for the UE from the plurality of power management modes based on the monitoring.

27. The UE of claim 16 wherein the instructions to select the power management mode from the plurality of power management modes are further configured to:
select the power management mode that increases processing of control channel region by increasing a clock rate of the UE.

28. A non-transitory computer readable medium for wireless communications implemented by a user equipment (UE), comprising code for:
receiving, at the UE, a subframe from a base station, wherein the UE supports a plurality of power management modes;
determining whether the subframe includes a channel grant allocated to the UE based on one or more of decoding a control channel region or through a radio resource control (RRC) layer signaling;
selecting a power management mode for the UE from the plurality of power management modes based on the determining; and
configuring the UE to the power management mode selected,
wherein the selecting the power management mode from the plurality of power management modes based on the determining comprises:
determining at least one channel condition between the UE and the base station; and
identifying a first candidate power management mode from the plurality of power management modes based on determining the channel condition, wherein the plurality of power management mode comprises at least a full performance mode, a power-performance tradeoff mode and a power optimal mode.

29. An apparatus for wireless communications implemented by a user equipment (UE), comprising:
means for receiving, at the UE, a subframe from a base station, wherein the UE supports a plurality of power management modes;
means for determining whether the subframe includes a channel grant allocated to the UE based on one or more of decoding a control channel region or through a radio resource control (RRC) layer signaling;
means for selecting a power management mode for the UE from the plurality of power management modes based on the determining; and
means for configuring the UE to the power management mode selected,
wherein the means for selecting the power management mode from the plurality of power management modes based on the determining comprises:
means for determining at least one channel condition between the UE and the base station; and
means for identifying a first candidate power management mode from the plurality of power management modes based on determining the channel condition, wherein the plurality of power management mode comprises at least a full performance mode, a power-performance tradeoff mode and a power optimal mode.

* * * * *